United States Patent
Kimura et al.

(10) Patent No.: US 7,237,738 B2
(45) Date of Patent: Jul. 3, 2007

(54) DEMOLISHING AND CUTTING MACHINE

(75) Inventors: Sehiro Kimura, Nabari (JP); Tomoki Uchida, Nabari (JP)

(73) Assignee: Nippon Pneumatic Manufacturing Co., Ltd., Osaka-shi (JP)

( * ) Notice: Subject to any disclaimer, the term of this patent is extended or adjusted under 35 U.S.C. 154(b) by 126 days.

(21) Appl. No.: 10/523,361

(22) PCT Filed: Aug. 4, 2003

(86) PCT No.: PCT/JP03/09890

§ 371 (c)(1),
(2), (4) Date: Feb. 7, 2005

(87) PCT Pub. No.: WO2004/016881

PCT Pub. Date: Feb. 26, 2004

(65) Prior Publication Data

US 2006/0032955 A1    Feb. 16, 2006

(30) Foreign Application Priority Data

Aug. 6, 2002 (JP) ............................. 2002-228410
Aug. 22, 2002 (JP) ............................. 2002-242418

(51) Int. Cl.
*B02C 1/06* (2006.01)
(52) U.S. Cl. .................................. 241/101.73; 241/266
(58) Field of Classification Search ........... 241/101.73, 241/266; 144/34.5

See application file for complete search history.

(56) References Cited

U.S. PATENT DOCUMENTS 3,294,131 A    12/1966    Larson
5,060,378 A *  10/1991    LaBounty et al. ............. 30/134

FOREIGN PATENT DOCUMENTS

JP    3-40504    8/1991
JP    2556664    9/1996

* cited by examiner

*Primary Examiner*—Mark Rosenbaum
(74) *Attorney, Agent, or Firm*—Wenderoth, Lind & Ponack, L.L.P.

(57) ABSTRACT

A demolition cutter which can smoothly cut an object while eliminating the possibility of any gap being formed between mating surfaces having cutting edges. The cutter includes an arm pin 8 extending between a pair of side plates 6 of a movable bracket 3. Two arms 9a and 9b are mounted on the arm pin 8 so as to be pivotable about the pin 8 between open and closed positions. Cylinders 14a and 14b are connected to the arms 9a and 9b, respectively. The arms 9a and 9b have mating surfaces 11 formed with cutting edges adapted to cut an object when they cross each other. The cylinders 14a and 14b have their axes offset outwardly from the mating surfaces 11 so that when the cylinders are extended, the arms 9a and 9b are closed with their mating surfaces 11 in close contact with each other. This prevents the formation of a gap between the mating surfaces during cutting.

4 Claims, 11 Drawing Sheets

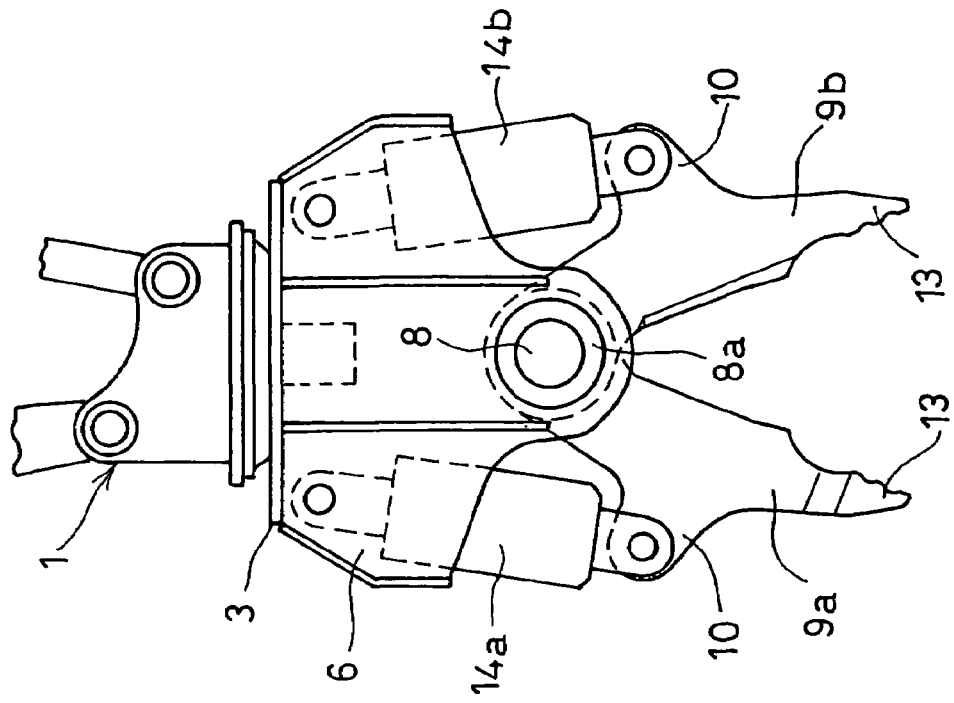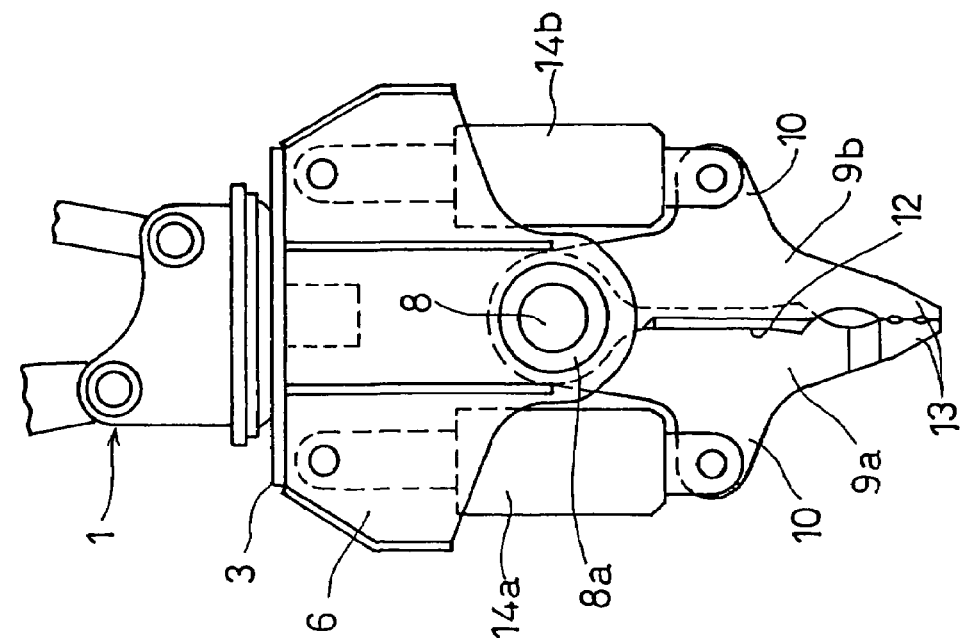

DEMOLISHING AND CUTTING MACHINE

TECHNICAL FIELD

The present invention relates to a demolition cutter adapted to be mounted on the free end of an arm of e.g. a hydraulic shovel.

BACKGROUND ART

Before remodeling the interior of a house or a factory building, it is often necessary to dismantle existing ceilings and/or walls by means of a demolition cutter.

Such a demolition cutter is disclosed in JP patent 2556664. The demolition cutter disclosed in this patent includes a bracket detachably mounted to the free end of a construction machine and having a pair of side plates. An arm pin extends between the side plates of the bracket. A pair of cutter arms are pivotally mounted on the arm pin. A cylinder is connected to each of the cutter arms to pivot it about the arm pin. The cutter arms have mating surfaces formed with cutting edges. By actuating the cylinders in such directions that the cutter arms close until their cutting edges cross each other like scissors, an object sandwiched between the cutting edges is cut.

FIG. 10A is a development of the cutter disclosed in the above publication, showing the relationship between the cutter arms and their cylinders. In FIG. 10A, two arm pins 41 are shown. But this is merely because this figure is a development. The actual cutter has only one such pin 41. In FIG. 10A, as well as in FIG. 10B, the cutter arms are designated by numerals 42a and 42b, the cylinders by 43a and 43b, the mating surfaces by 44, and the cutting edges by 45.

In this conventional demolition cutter, the axes of the cylinders are present in the plane X1 including the mating surfaces 44 of the cutter arms 42a, 42b. Thus, the arm-closing forces generated by the cylinders 43a and 43b act on the respective cutter arms 42a and 42b along the plane X1. Thus, when the cylinders are actuated to close the cutter arms 42a and 42b with an object W to be cut sandwiched between the cutter arms, the cutter arms tend to pivot outwardly as shown in FIG. 10B. When the cutter arms are repeatedly pivoted outwardly, it becomes increasingly difficult to smoothly cut the object W.

The arm pin 41 is loosely inserted in pin holes 46 formed in the cutter arms 42a and 42b. That is, gaps are present between the pin 41 and the pin holes 46. Thus, when the cylinders are actuated to close the cutter arms with the object W clamped between the cutting edges 45 in an inclined state, the tips of the cutter arms 42a and 42b are pushed outwardly, so that the cutter arms 42a and 42b pivot outwardly within the range permitted by the gaps between the pin 41 and the pin holes 46 as shown in FIG. 10B. Since the arm-closing forces generated by the cylinders act on the arms along the plane X1, they cannot prevent the cutter arms from pivoting. Since the tips of the cutter arms are pushed outwardly, gaps are present between the mating surfaces 44 and thus between the cutting edges 45 when cutting the object W. This makes it difficult to cut the object W cleanly.

When the cutter arms 42a and 42b pivot outwardly about the pin 41, as shown in FIG. 11, the cutter arms are pressed hard against each other at their ends, shown at P1. The cutter arms 42a and 42b are also pressed hard against the side plates 47 of the bracket at points P2. Thus, the frictional resistance between the cutter arms and between the cutter arms and the side plates of the bracket hampers smooth pivoting motion of the cutter arms 42a and 42b in the closing directions. Also, the force from the cylinders acts on the arm pin 41 at its longitudinal center and may deflect and in the worst case break the pin.

Chips as well as a soft or thick object W to be cut tend to get stuck between the mating surfaces 44, thus hampering smooth cutting, or causing outward deformation of the tips of the arms 42a and 42b.

When the cylinders are extended, their thrust force acts along the mating surfaces 44 of the cutter arms 42a and 42b, so that it is necessary to form the cutting edges by cutting out the mating surfaces 44. This results in a reduction in thickness of the cutter arms in their areas where the cutting edges are formed. Thus, in order to reinforce these areas, reinforcements or some other measures are necessary, which of course pushes up the cost of the entire cutter.

In order to avoid these shortcomings, in one conventional demolition cutter, pads or guide rails are provided on the outer sides of the cutter arms to prevent the arms from pivoting outwardly. But such extra members add to the number of parts and thus the cost of the cutter.

In conventional cutters, each cylinder has its body connected to the movable bracket and the piston rod to one of the cutter arms. Thus, the piston rods protrude from the movable bracket. Thus, the piston rods tend to be damaged by hitting against obstacles.

An object of the invention is to provide a demolition cutter in which the cylinders are arranged such that pushing force from the cylinders can minimize inclination of the cutter arms and outward deformation of the tips of the cutter arms when the cylinders are extended to close the cutter arms, thereby eliminating any gap between the mating surfaces of the cutter arms so that an object to be cut can be cut smoothly.

A second object of the invention is to provide a compact demolition cutter which prevents damage to the piston rods of the cylinders for opening and closing the cutter arms, and which ensures smooth demolition work.

DISCLOSURE OF THE INVENTION

According to the invention, there is provided a demolition cutter comprising a stationary bracket adapted to be connected to an arm of a construction machine, a movable bracket rotatably coupled to the stationary bracket and including a pair of opposed side plates, an arm pin extending between the pair of side plates, a pair of cutter arms pivotally mounted on the arm pin so as to be pivotable between an open position and a closed position, and a pair of cylinders each connected to one of the cutter arms, the stationary bracket carrying a rotary joint, the cylinders being extended and retracted by supplying pressure oil into the cylinders through the rotary joint, thereby pivoting the cutter arms between the open and closed positions, the arms having mating surfaces that are superposed on each other and formed with cutting edges that are configured to cross each other when the arms are pivoted toward the closed position, thereby cutting an object sandwiched therebetween, the cylinders having a central axis, at least one of the central axes of the cylinders being offset in the direction of the axis of the arm pin from the plane including the mating surfaces so that a plane including the axes of the cylinders intersects the plane including the mating surfaces.

By offsetting at least one of the central axes of the cylinders in the direction of the axis of the arm pin from the plane including mating surfaces, when the cylinders are extended to close the cutter arms, the pushing force from the cylinders act on the cutter arms parallel to the mating surfaces along planes offset from the mating surfaces. Thus, even if the tips of the cutter arms are pushed outwardly by obliquely abutting an object to be cut, the pushing force from the cylinder serves to correct the orientation of the arms, that is, prevent the cutter arms from inclining outwardly. This prevents formation of a gap between the mating surfaces of the cutter arms, which in turn keeps high cutting force. An object can thus be cut smoothly.

In one arrangement of the invention, both axes of the two cylinders are offset from the plane including the mating surfaces. In another arrangement, only one of the axes of the two cylinders is offset. In either arrangement, the plane including the axes of the two cylinders intersects the plane including the mating surfaces.

That is, the former plane is inclined relative to the latter plane.

Since the force from the cylinders acts on the arm pin at points offset from its longitudinal center toward its ends, the arm pin is less likely to be deflected. Also, the cutter arms are less likely to be pressed hard against each other at their rear ends or against the side plates of the bracket. This keeps the rotational resistance small, so that the cutter arms can be closed smoothly.

The cutter arms each include a gripper portion for gripping, in cooperation with the other gripper portion, an object to be dismantled. By gripping objects to be dismantled such as reinforciong steel or panels, they can be sheared, crushed, or moved to a position where they can be more easily cut, and cut.

From another aspect, the invention provides a demolition cutter of of the above-described type wherein each of the cylinders comprises a cylinder body connected to one of the cutter arms, and a piston received in the cylinder body and including a piston rod having a rear end thereof connected to the movable bracket, the piston defining a front chamber and a rear chamber in the cylinder body in front and back thereof, the piston rod being formed with a first oil passage communicating with the front chamber and a second oil passage communicating with the rear chamber, the rotary joint including a rotary cylinder secured to the movable bracket and formed with a pair of first oil ports each facing one of the cylinders, and a pair of second oil ports each facing one of the cylinders, the first and second oil passages formed in the piston rod of each of the cylinders being connected to one of the first oil ports and one of the second oil ports, respectively, through hydraulic hoses.

By coupling the piston rods of the cylinders to the movable brackets and the cylinder bodies to the respective cutter arms, the cylinder body of each cylinder moves axially relative to the piston rod. Thus, the piston rods are always covered by the movable bracket, so that the piston rods will never be damaged by hitting against obstacles during use of the cutter.

By providing the piston rod of each cylinder with the first oil passage, which communicates with the front chamber, and the second oil passage, which communicates with the rear chamber, and connecting the first and second oil passages to the first and second oil ports of the rotary joint through the hydraulic hoses, the hoses are also covered by the movable bracket. Thus, when dismantling objects, the hoses will never be caught by the objects to be dismantled, or otherwise get in the way of dismantling work. They will never be damaged either. This ensures efficient dismantling work.

By providing the rotary cylinder of the rotary joint with the first and second oil ports so as to face the cylinders, the ends of the hydraulic hoses connected to the rotary joint are disposed between the rotary cylinder of the rotary joint and the cylinders. This leads to a further reduction in the distance between the side plates of the movable bracket.

BRIEF DESCRIPTION OF THE DRAWINGS

FIGS. 9A and 9B are front views of a cutter of a third embodiment, when the cutter arms are fully opened and fully closed, respectively.

BEST MODE FOR EMBODYING THE INVENTION

Figure 1:
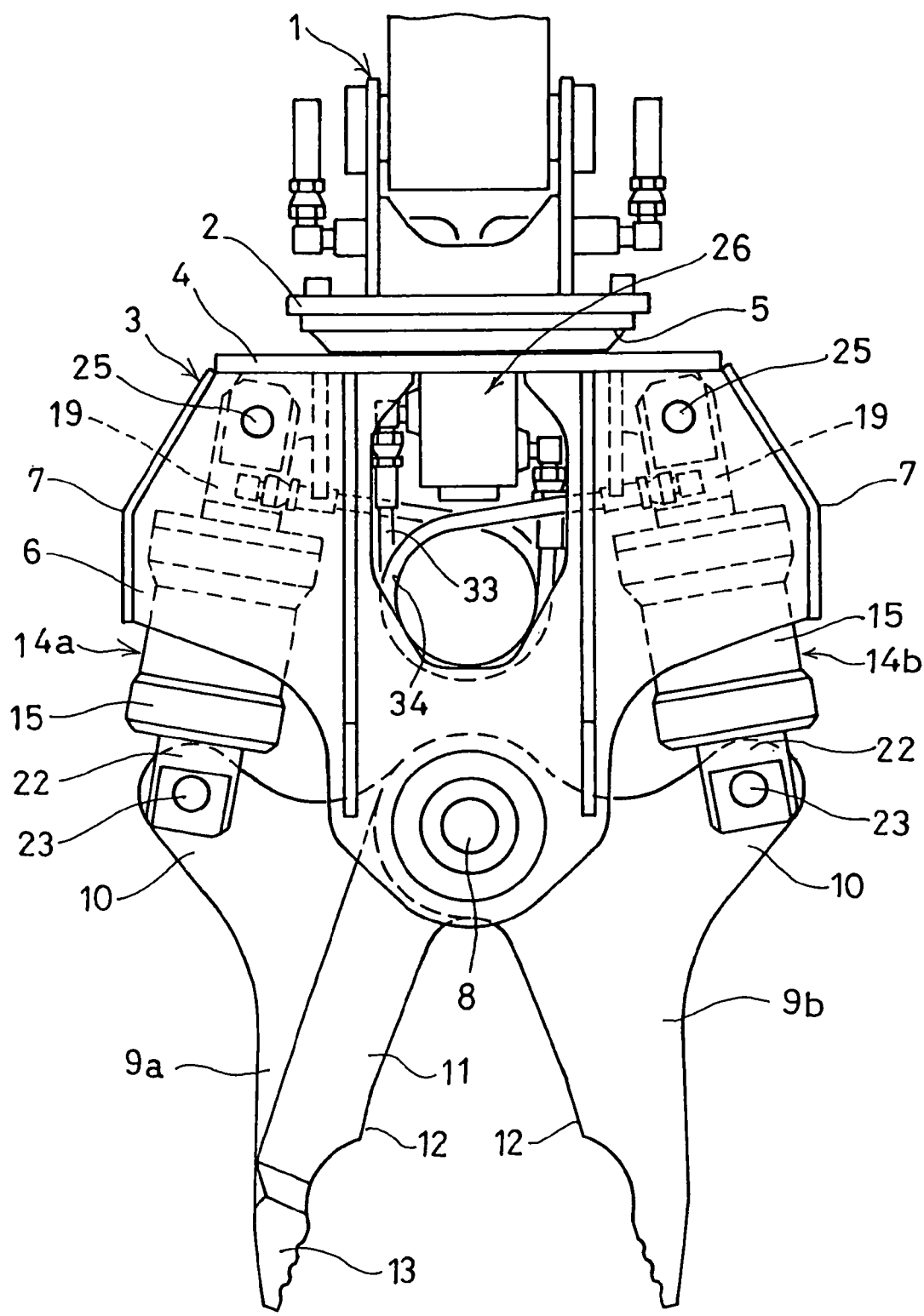
FIG. 1 is a front view of a demolition cutter of a first embodiment of the invention.
Figure 2:
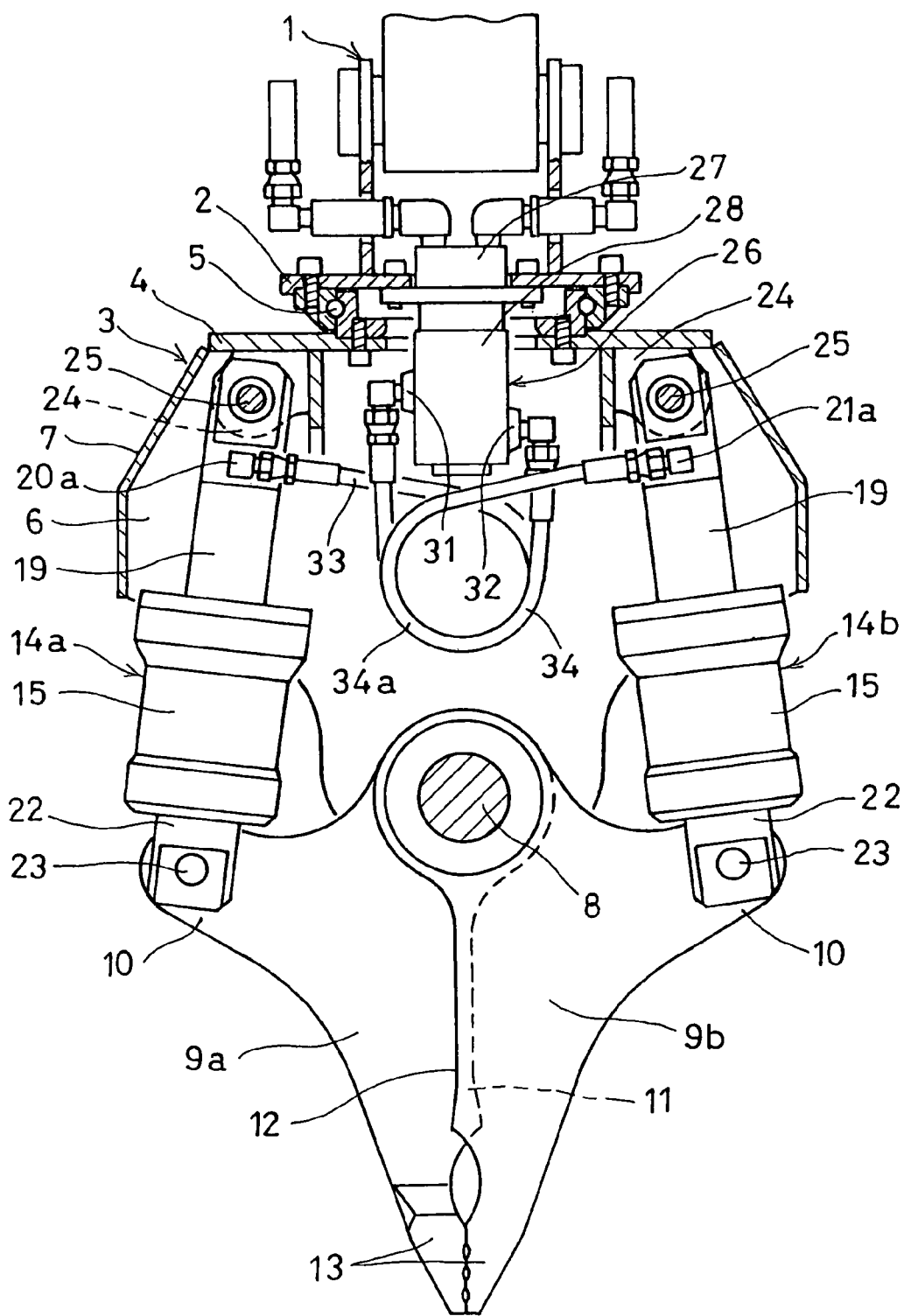
FIG. 2 is a front view in vertical section of the demolition cutter of FIG. 1.
Figure 3:
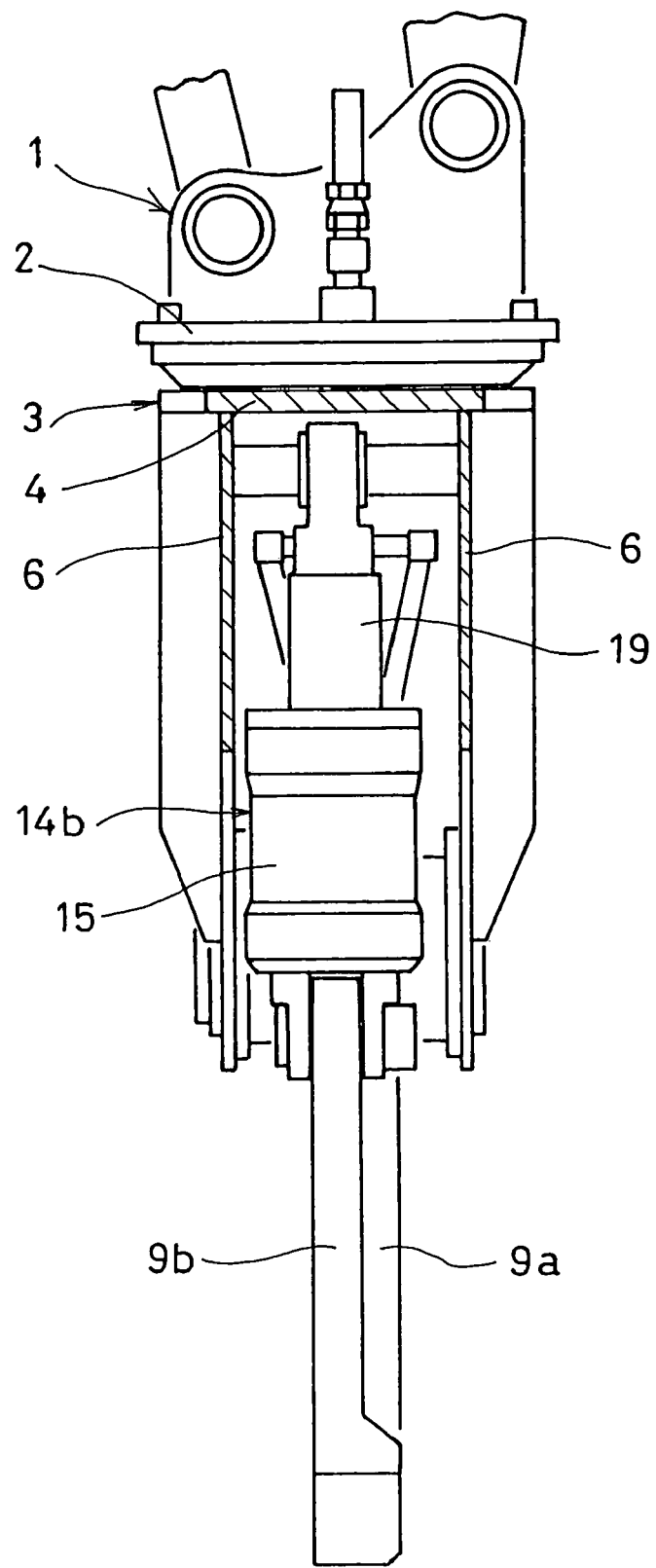
FIG. 3 is a vertical sectional side view of FIG. 2.

As shown in FIGS. 1–3, the demolition cutter of the first embodiment includes a stationary bracket 1 adapted to be detachably mounted to the free end of an arm of a construction machine such as a hydraulic shovel. The bracket 1 has a support plate 2 on which is rotatably supported a coupling plate 4 through a bearing 5 so as to oppose the support plate 2. The coupling plate 4 supports a movable bracket 3. The movable bracket 3 is thus rotatable relative to the stationary bracket 1.

The movable bracket 3 is a box comprising a pair of side plates 6 extending from the side edges of the coupling plate 4 and a pair of end plates 7 extending from the end edges of the coupling plate 4. An arm pin 8 extends between the side plates 6 near their free ends. A pair of cutter arms 9a and 9b have their rear ends mounted on the arm pin 8 so as to be pivotable about the pin 8 between open and closed positions. The cutter arms 9a and 9b are each formed with a coupling piece 10 at its outer portion. The cutter arms 9a and 9b have mating surfaces 11 adapted to be superposed on each other when the cutter arms are closed. The mating surfaces 11 have cutting edges 12. The cutter arms 9a and 9b have gripper portions 13 at their tips.

Cylinders 14a and 14b are connected to the respective coupling pieces 10 of the cutter arms 9a and 9b.

Figure 7:
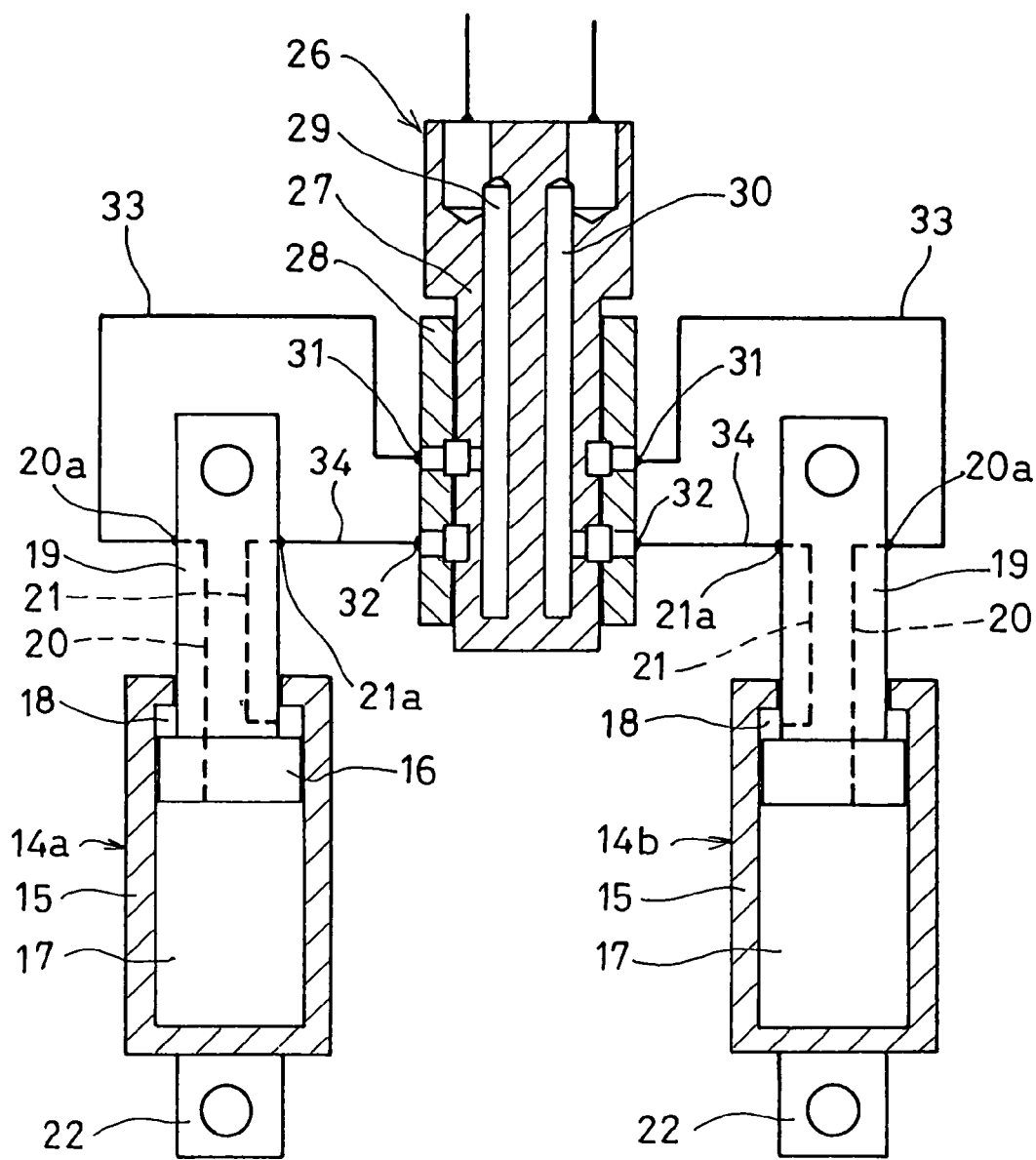
FIG. 7 is a schematic sectional view of the cutter of FIG. 1, showing the relationship between the rotary joint shown in FIG. 2 and the cylinders.

The cylinders 14a and 14b each comprise a cylinder body 15, and a piston 16 slidably mounted in the cylinder body 15 to define front and rear chambers 17 and 18 in the cylinder body 15 as shown in FIG. 7. The piston 16 has a piston rod 19 slidably extending into the cylinder body 15 and is formed with a first oil passage 20 communicating with the front chamber 17 and a second oil passage 21 communicating with the rear chamber 18. The oil passages 20 and 21 have hose connecting ports 20a, 21a that open at the outer periphery of the piston rod 19 near its rear end.

Each of the cylinders 14a and 14b has a mounting piece 22 provided on a head cover of the cylinder body 15 and coupled to the coupling piece 10 of the corresponding arm 9a, 9b through a pin 23. Its piston rod 19 is coupled at its rear end to one of two connecting pieces 24 secured to the front side of the coupling plate 4 by means of a pin 25. Thus, the cylinder body 15 is axially movable relative to the piston 16. The cylinders 14a and 14b are structured such that when their respective cylinder body 15 is extended to its limit, the rear end of the cylinder body 15 is still disposed between the side plates 6 of the movable bracket 3.

As shown in FIG. 2, the support plate 2 of the stationary bracket 1 supports a rotary joint 26 through which pressure oil is supplied into the cylinders 14a and 14b and oil is discharged from the cylinders 14a and 14b into a tank, not shown.

As shown in FIG. 7, the rotary joint 26 comprises a joint body 27 fixed to the support plate 2 of the stationary bracket 1 (see FIG. 2), and a rotary cylinder 28 rotatable relative to the joint body 27.

As shown in FIG. 7, a first passage 29 and a second passage 30 are formed in the joint body 27. The rotary cylinder 28 is formed with two first oil ports 31 communicating with the first passage 29, and two second oil ports 32 communicating with the second passage 30.

As shown in FIG. 2, each of the first oil ports 31 and each of the second oil ports 32 face one of the cylinders 14a and 14b. As shown in FIG. 7, each of the first oil ports 31 and each of the second oil ports 32 are connected to the hose-connecting port 20a and 21a of the first and second oil passages 20 and 21 of one of the cylinders 14a and 14b through hydraulic hoses 33 and 34, respectively. Each of the hoses 33 and 34 forms a loop in front of the rotary joint 26. The loops serve to absorb any tensile and other forces applied to the hoses 33 and 34 when the cylinders 14a and 14b pivot about the pin 25 due to extension or retraction of the cylinders, thereby keeping the hoses 33 and 34 from being subjected to any undue external force.

Figure 5:
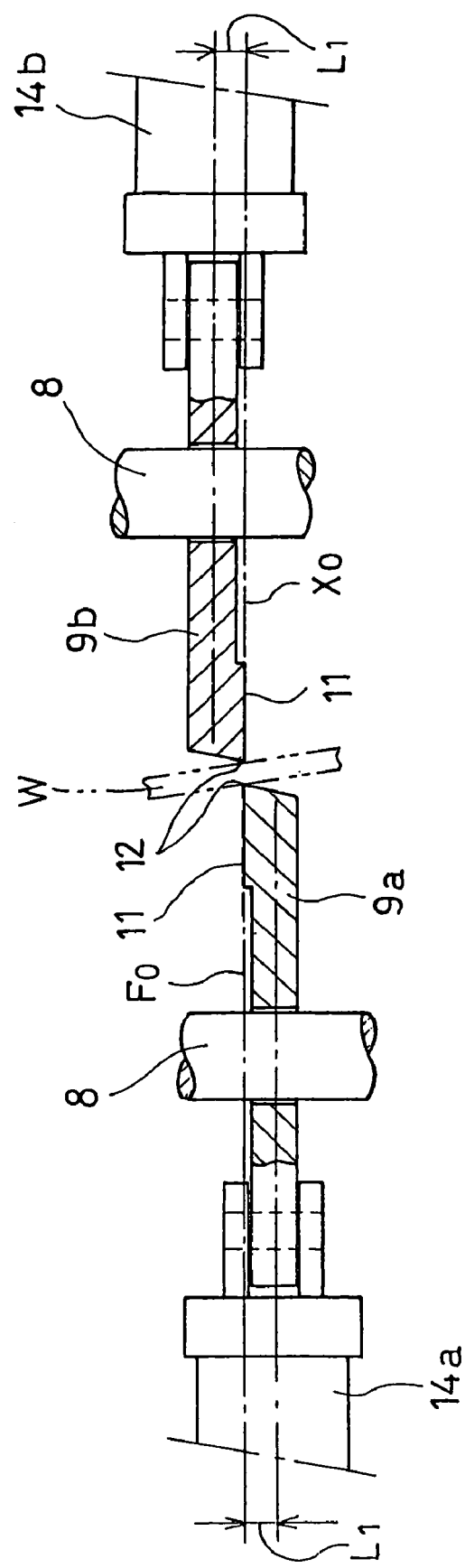
FIG. 5 is a development of the cutter of FIG. 1, showing the relationship between the cutter arms and the cylinders.

FIG. 5 is a development of the cutter of FIG. 1, showing the relationship between the cutter arms 9a, 9b and the cylinders 14a, 14b. From FIG. 5, the cutter appears to have two arm pins 8. But this is merely because FIG. 5 is a development. The actual cutter has only one such arm pin 8. As shown in FIG. 5, the mating surfaces 11 are in a single plane X0. The axes of the cylinders 14a and 14b are offset outwardly by a distance L1 from the plane X0 in opposite directions to each other. The offset distance L1 is adjusted according to the required cutting force and the shape of the arms.

Figure 4:
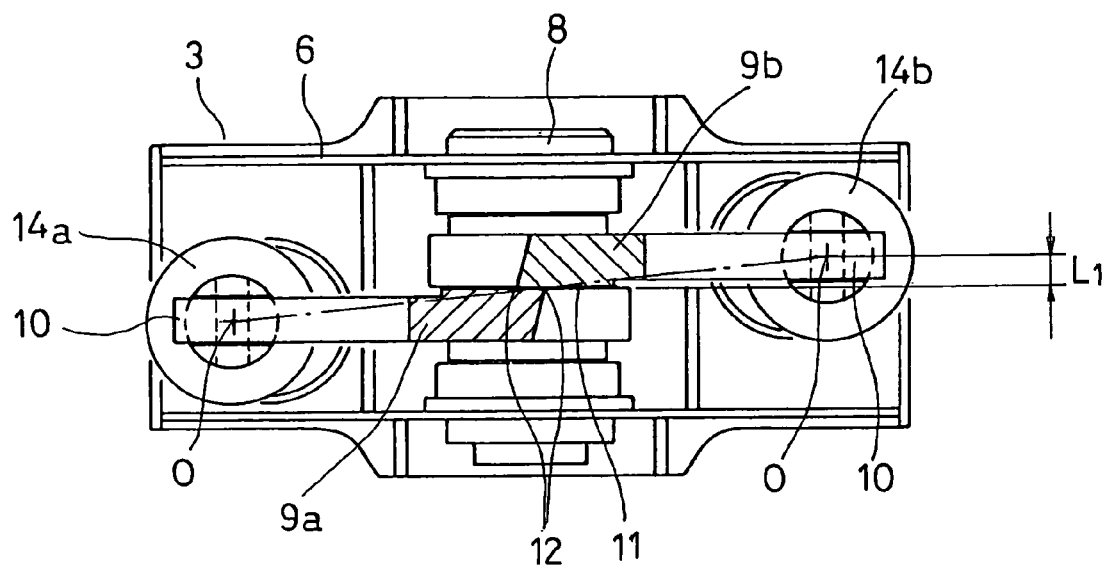
FIG. 4 is a bottom plan view in cross-section of FIG. 2.

As shown in FIG. 4, the plane containing the axes (indicated by "0" in FIG. 4) of both cylinders 14a and 14b intersects (and thus is inclined relative to) the mating surfaces 11.

Figure 6:
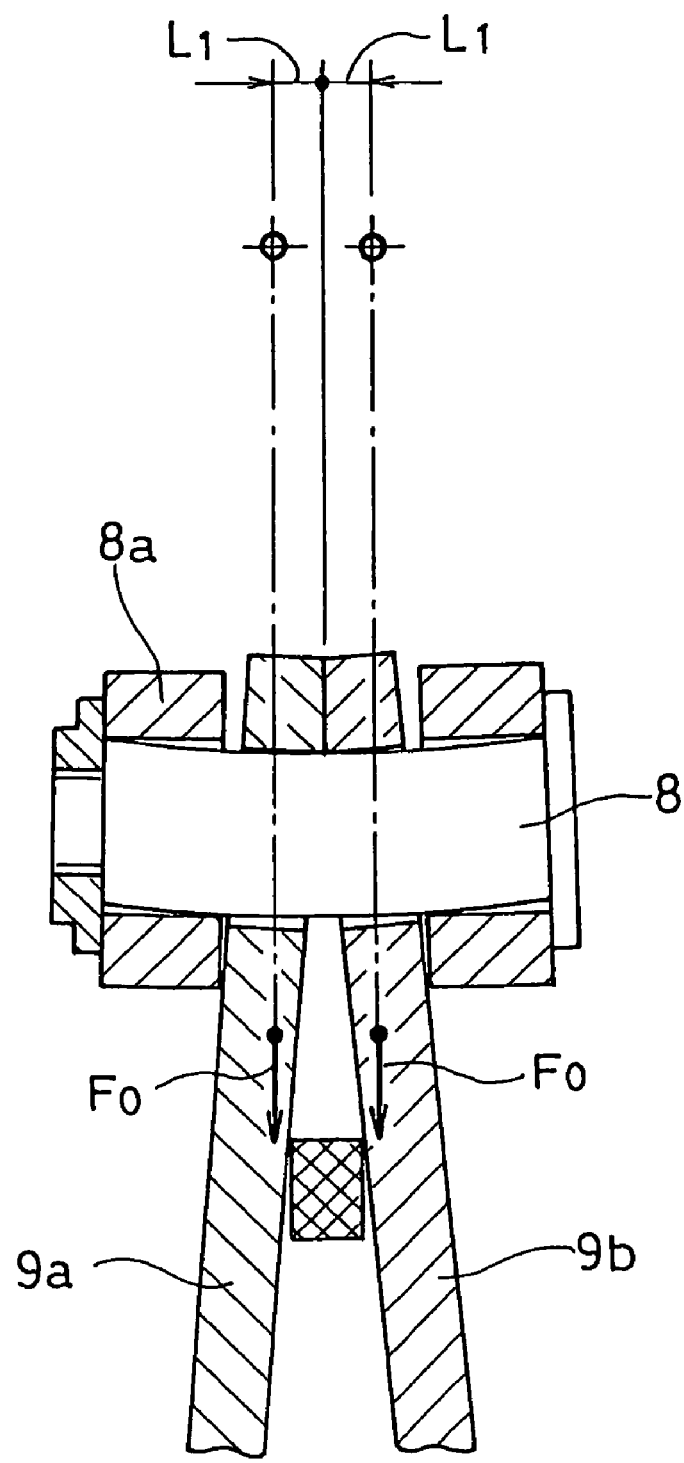
FIG. 6 is a sectional view of the cutter of FIG. 1, showing how an object is cut.

When the cutter arms 9a and 9b are pivoted in the closing directions by extending the cylinders 14a and 14b with an object W to be cut engaged between the cutting edges 12, the cutting edges 12 tend to abut the object W obliquely, so that the cutter arms 9a and 9b tend to pivot outwardly as shown in FIG. 6. But since the axes of the cylinders 14a and 14b are offset outwardly from the plane X0, i.e. the plane containing the mating surfaces 11, the pushing forces F0 applied from the cylinders 14a and 14b to the arms 9a and 9b serve to cancel the tendency of the arms 9a and 9b to pivot outwardly.

This prevents the arms 9a and 9b from pivoting outwardly, so that the object W can be cut with the mating surfaces 11 and thus the cutting edges 12 of the arms 9a and 9b always in close contact with each other. The object W can thus be cut smoothly with a minimum loss of cutting force.

Since the arms 9a and 9b are less likely to pivot outwardly, the arms 9a and 9b are less likely to be pressed hard against each other at the inner surfaces of their rear ends, or against end faces of bearings 8a for the arm pin 8 which are mounted to the side plates 6 of the movable bracket 3. Thus, the arms 9a and 9b can be pivoted smoothly in the closing directions without encountering any significant resistance.

Also, the pushing forces F0 from the cylinders 14a and 14b act on the arm pin 8 at its portions offset toward its ends from its longitudinal center. The arm pin 8 is thus less likely to be deflected by such forces and thus is less likely to be broken, even if its diameter is relatively small.

The gripper portions 13 at the tips of the arms 4a and 4b are used to grip and tear or crush the objects to be dismantled when the arms are closed.

To open and close the arms 9a and 9b, the cylinders 14a and 14b are extended and retracted by selectively supplying pressure oil into the first and second passages 29 and 30 formed in the rotary joint 26 as shown in FIG. 7.

Because the piston rods 19 of the cylinders 14a and 14b are connected to the movable bracket 3 at their rear ends, and the cylinder bodies 15 are connected to the respective arms 9a and 9b, the cylinder bodies 15 are moved axially by supplying pressure oil. When the cylinder bodies 15 are extended to their limit, the rear ends of the cylinder bodies 15 are still inside of the movable bracket 3. Thus, the piston rods 19 are always covered by the movable bracket 3.

The piston rods 19 will therefore never be damaged by obstacles by hitting against them during use.

Since the piston rods 19 are each formed with the first oil passage 20, which communicates with the front chamber 17 defined in front of the piston, and the second oil passage 21, which communicates with the rear chamber 18, and the hose-connecting ports 20a and 21a of the first and second oil passages 20 and 21 are connected to the first and second oil ports 31 and 32 of the rotary joint 26 through the hydraulic hoses 33 and 34, respectively, the hoses 33 and 34 are always covered by the movable bracket 3. Thus, the hoses will never be caught on the objects to be dismantled or otherwise get in the way of dismantling work. They will never be damaged either.

Since the rotary joint 26 is formed with the first and second oil ports 31 and 32 so as to face the cylinders 14a and 14b, the ends of the hydraulic hoses 33 and 34 are disposed between the rotary joint 26 and the piston rods 19 of the cylinders 14a and 14b. This makes it possible to reduce the distance between the side plates 6 of the movable bracket 3.

Figure 8:
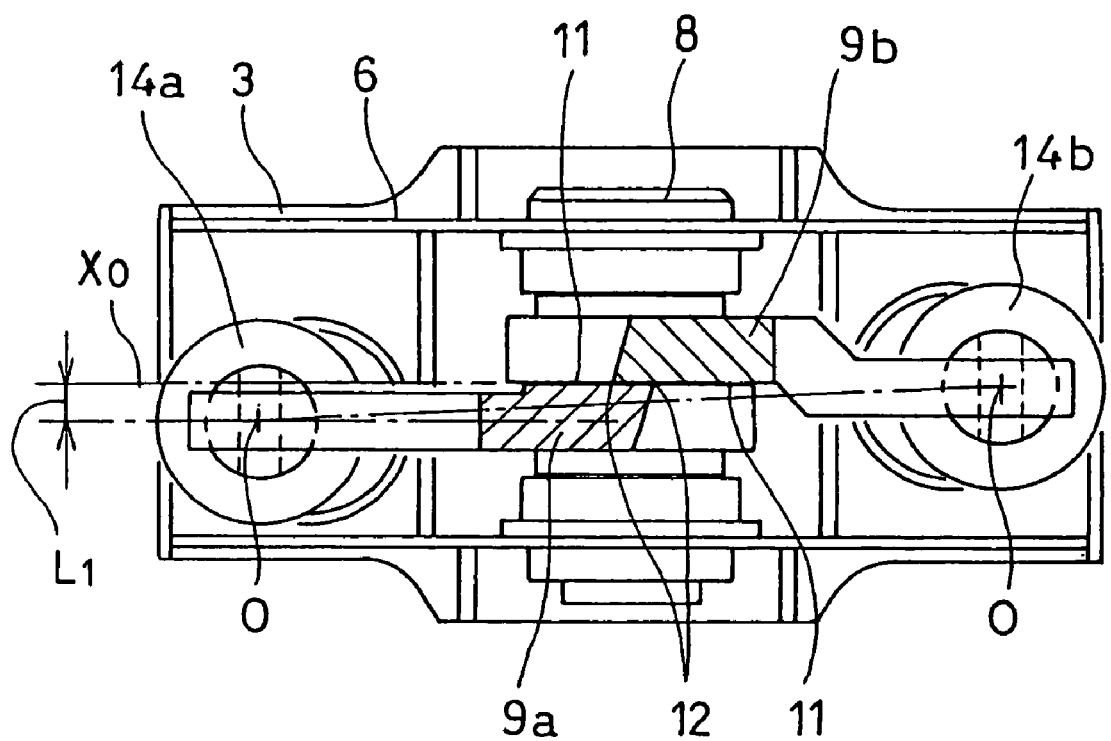
FIG. 8 is a bottom plan view in cross-section of a demolition cutter of a second embodiment.
Figure 10A:
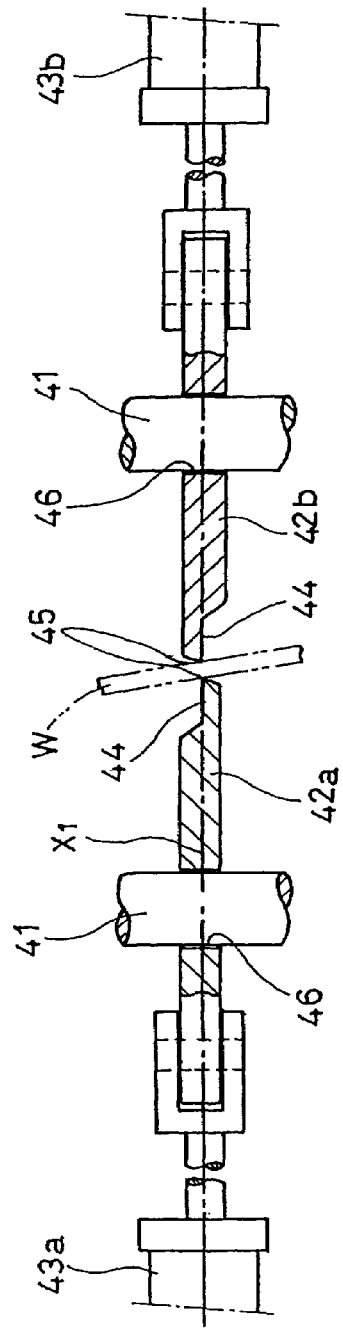
FIG. 10A is a development of a conventional demolition cutter, showing the relationship between the cutter arms and the cylinders.
Figure 10B:
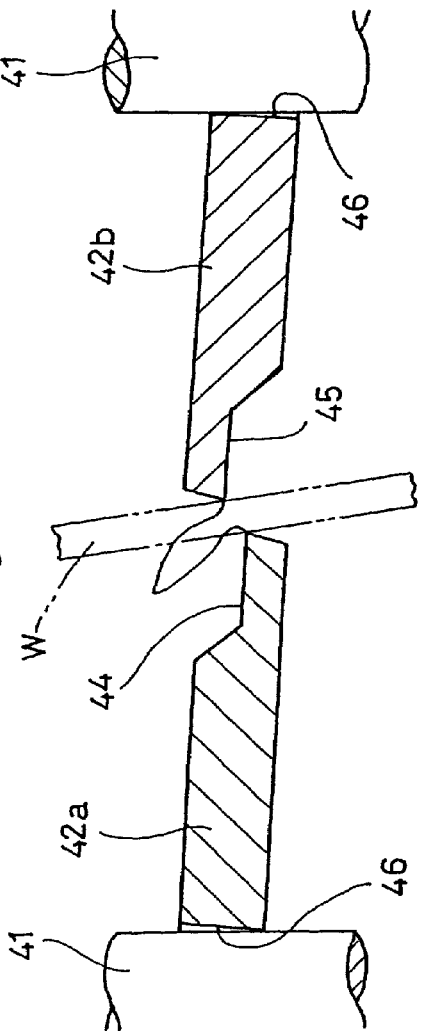
FIG. 10B is a sectional view of the cutter of FIG. 10A, showing how the cutter arms are deflected.
Figure 11:
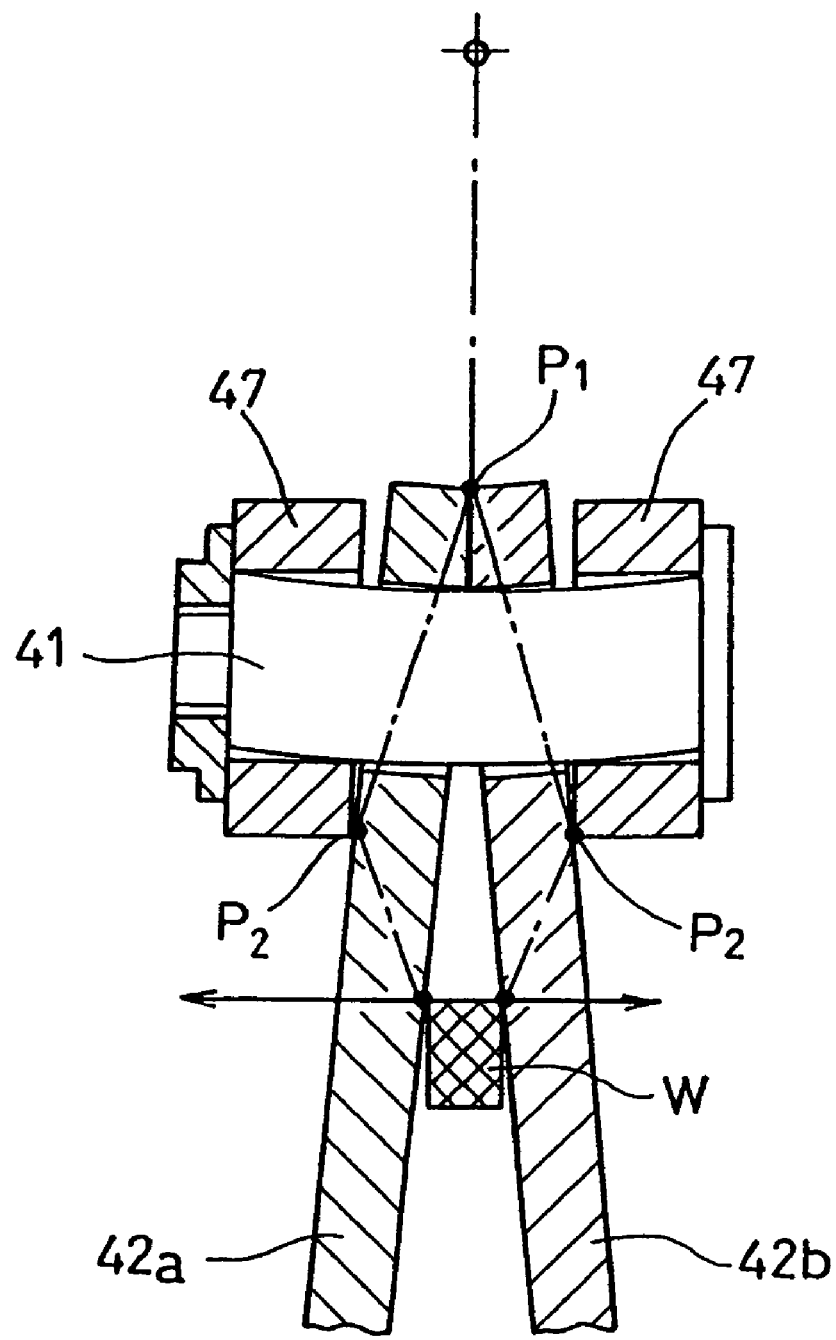
FIG. 11 is a sectional view of the cutter of FIG. 10A when an object is being cut.

In the embodiment of FIGS. 4 and 5, the cylinders 14a and 14b are arranged such that their axes are offset outwardly from the plane X0 containing the mating surfaces 11 in opposite directions to each other. But instead, as shown in FIG. 8, only one of the cylinders 14a and 14b may be arranged so that its axis is offset outwardly from the plane X0.

Instead of supporting the two arms 9a and 9b on the single arm pin 8, the arms 9a and 9b may be individually supported on two separate pins.

FIGS. 9A and 9B show the demolition cutter of the third embodiment. This embodiment differs from the first embodiment (FIG. 1) in that the cylinder coupling pieces 10 of this embodiment are provided closer to the tips of the arms 9a and 9b than the coupling pieces 10 of the first embodiment to such an extent that the cylinders 14a and 14b are connected to the arms 9a and 9b at points forwardly of the arm pin 8 even when the arms are fully opened as shown in FIG. 9A.

By providing the cylinder coupling pieces 10 closer to the tips of the arms 9a and 9b, greater tensile force is applied to the connecting points between the arms 9a and 9b and the cylinders 14a and 14b while an object W is being cut by extending the cylinders 14a and 14b. This force serves to prevent the arms 9a and 9b from deflecting outwardly. In other words, the increased tensile force increases the bending rigidity of the arms 9a and 9b, thereby preventing the portions of the arms 9a and 9b where the cutting edges 12 are formed from being deflected outwardly or deformed. The object W can thus be cut more effectively.

INDUSTRIAL APPLICATION

According to the invention, since at least one of the cylinders is arranged such that its axis is offset outwardly from the plane of the mating surfaces of the arms, the arms are less likely to pivot outwardly while cutting an object by extending the cylinders. Thus, no gap will be formed between the mating surfaces during cutting, which allows smoother cutting. There is no need to attach members for preventing the mating surfaces from moving away from each other, such as pads or guide blades. The cutter according to the invention is thus made up of a smaller number of parts and thus is less costly.

When the arms are closed by extending the cylinders, the pushing force from the cylinders is applied to the arm pin at points offset from its longitudinal center toward its ends. The arm pin is thus less likely to be deflected by this force. This makes it possible to reduce the diameter of the arm pin.

By coupling the cylinders to the arms at points closer to the tips of the arms, the bending rigidity of the arms increases. The arms are thus less likely to be deflected or deformed outwardly during cutting.

Since the piston rods of the cylinders are always covered by the movable bracket, the piston rods will never be damaged by hitting against objects during cutting.

Since the piston rods are each formed with a first oil passage, which communicates with the front chamber, and a second oil passage, which communicates with the rear chamber, the hydraulic hoses connecting the respective oil passages to the first and second oil ports of the rotary joint are always covered by the movable bracket. Thus, the hoses will never be caught on objects to be dismantled or otherwise get in the way of dismantling work. They will never be damaged either.

Since the rotary cylinder of the rotary joint is formed with the first and second oil ports so as to face the cylinders, ends of the hydraulic hoses connected to the oil ports are also provided on both sides of the rotary joint. This makes it possible to reduce the distance between the side plates of the movable bracket.

What is claimed is:

1. A demolition cutter comprising:
   a stationary bracket carrying a rotary joint and adapted to be connected to an arm of a construction machine;
   a movable bracket rotatably coupled to said stationary bracket and including a pair of opposed side plates;
   an arm pin extending between said pair of side plates;
   a pair of cutter arms, pivotably mounted on said arm pin so as to be pivotable between an open position and a closed position, said cutter arms having surfaces formed with cutting edges that are configured to cross each other when said arms are pivoted toward said closed position; and
   a pair of cylinders each connected to one cutter arm of said pair of cutter arms, said cylinders being extended and retracted by supplying pressure oil into said cylinders through said rotary joint, thereby pivoting said cutter arms between said open and closed positions, said cylinders each having a central axis;
   wherein at least one of said central axes of said cylinders is offset in the direction of the axis of said arm pin from a plane including said mating surfaces so that a plane including said axes of said cylinders intersects said plane including said mating surfaces;
   wherein each of said cylinders comprises
      a cylinder body connected to one of said cutter arms;
      a piston received in said cylinder body, said piston defining a front chamber and a rear chamber in said cylinder body in front and back thereof; and
      a piston rod having a rear end thereof connected to said movable bracket, said piston rod being formed with a first oil passage communicating with said front chamber and a second oil passage communicating with said rear chamber;
   wherein said rotary joint includes a rotary cylinder secured to said movable bracket and formed with a pair of first oil ports and a pair of second oil ports; and
   wherein said first oil passage and said second oil passage formed in said piston rod of each of said cylinders are connected to one of said pair of first oil ports and one of said pair of second oil ports, respectively.

2. The demolition cutter of claim 1 wherein said cutter arms each include a gripper portion for gripping, in cooperation with the other gripper portion, an object to be dismantled.

3. The demolition cutter of claim 2, wherein each of the ports of said pair of first oil ports is facing one of said cylinders and each of the ports of said pair of second oil ports is facing one of said cylinders.

4. The demolition cutter of claim 1, wherein each of the ports of said pair of first oil ports is facing one of said cylinders and each of the ports of said pair of second oil ports is facing one of said cylinders.

* * * * *